United States Patent [19]

Schweinzer et al.

[11] Patent Number: 5,000,144
[45] Date of Patent: Mar. 19, 1991

[54] INTERNAL COMBUSTION ENGINE

[75] Inventors: Franz Schweinzer; Hans Maier, both of Graz, Austria

[73] Assignee: AVL Gesellschaft Für Verbrennungskraftmaschinen und Messtechnik m.b.H. Prof.Dr.Dr.h.c. Hans List, Graz, Austria

[21] Appl. No.: 480,164

[22] Filed: Feb. 14, 1990

[30] Foreign Application Priority Data

Feb. 15, 1989 [AT] Austria .................................. 341/89

[51] Int. Cl.$^5$ .............................................. F02B 19/08
[52] U.S. Cl. ................................... 123/276; 123/263; 123/279
[58] Field of Search ............... 123/270, 276, 279, 263, 123/281, 285

[56] References Cited

U.S. PATENT DOCUMENTS 4,779,587 10/1988 Schweinzer et al. ................ 123/276

FOREIGN PATENT DOCUMENTS

| 0271478 | 11/1987 | European Pat. Off. | |
|---------|---------|---------------------|---------|
| 1106391 | 12/1955 | France              | 123/276 |
| 1179047 | 5/1959  | France              | 123/276 |
| 1211982 | 3/1960  | France              | 123/276 |
| 0408508 | 1/1945  | Italy               | 123/276 |
| 475433  | 2/1935  | Switzerland         |         |
| 0821836 | 1/1935  | United Kingdom      | 123/276 |

Primary Examiner—Willis R. Wolfe
Assistant Examiner—Thomas Moulis
Attorney, Agent, or Firm—Watson, Cole, Grindle & Watson

[57] ABSTRACT

In a valve-controlled internal combustion engine with direct fuel injection and a swirling air charge, a combustion chamber is located in the piston and is configured as a toroidal part ending in a throat-like cylindrical part towards the piston top. A narrow, ring-shaped overflow passage leads from the toroidal part to the cylindrical part of the combustion chamber. The proposal is put forward that the thermal and fluid-mechanical parameters be improved by placing the axis of the combustion chamber between the tip of the injection nozzle and the cylinder axis, and by varying the width of the ring-shaped overflow passage. The narrowest part of said overflow passage lying in the area closest to the tip of the nozzle, and further, the top of the center part is unsymmetrical, with a minimum distance to the injection jets at upper dead center of the piston.

8 Claims, 4 Drawing Sheets

INTERNAL COMBUSTION ENGINE

BACKGROUND OF THE INVENTION

This invention relates to a valve-controlled compression-ignition engine with direct fuel injection and a swirling air charge, whose combustion chamber is located in the piston and is configured as a toroidal part engine in a throat-like cylindrical part towards the top of the piston, a center part being provided in the center of the combustion chamber, which forms part of the toroidal section, its top remaining just slightly below the fuel jet of the injection nozzle at upper dead center of the piston and forming a narrow, ring-shaped overflow passage together with the throat, leading from the toroidal to the cylindrical part of the combustion chamber.

DESCRIPTION OF THE PRIOR ART

An internal combustion engine of the above kind is described in EP-A No. 0 271 478. In this engine the center of the combustion chamber is bounded by a rotationally symmetric center part, whose top, together with the restricted passage or throat formed by the cylindrical section, constitutes a narrow, ring-shaped overflow passage. The fuel jets of the injection nozzle are directed towards the area between the toroidal and the cylindrical part of the combustion chamber. The narrow, ring-shaped overflow passage formed in this way provides a high mixture-forming energy, which, along with the improved combustion values resulting therefrom, will compensate any throttle losses.

Above all in internal combustion engines with high injection pressures, whose peaks may well reach 600 or even 1000 bar and more, the percentage of fuel deposited on the walls of the combustion chamber is processed more efficiently than in conventional toroidal combustion spaces, for instance as described in CH-PS No. 175 433.

The center part in the center of the combustion chamber of the internal combustion engine according to EP-A No. 0 271 478, and the large useful surface of this combustion chamber prevent the fuel films produced by different injection jets from interfering with each other, which would be harmful to the combustion process. At the same time this center part reduces the formation of low turbulence zones in the middle of the combustion chamber. The high velocity of the charge generated by the narrow overflow passage in conjunction with the angular momentum of the air charge is maintained in the toroidal chamber for some time, which will ensure optimum fuel preparation. The advantages of the above design as regards the operating behavior of the engine are as follows. The smoke-limiting full load may be increased. It is possible to achieve high compressions ($\epsilon = 19$–24) resulting in lower combustion noise due to smaller ignition lags, lower hydrocarbon emissions, improved starting behavior and greater efficiency of the engine. In addition, a "late" ignition timing may be selected without any major increase in smoke, fuel consumption and HC emissions, by utilizing the fact that a high level of mixture-forming energy is mantained for a prolonged period of time. This implies above all that nitric oxides, combustion noise and cylinder peak pressure may be reduced.

Disadvantages are only encountered if, due to an eccentric position of the tip of the injection nozzle, the combustion chamber whose axis is situated in the vicinity of the tip of the injection nozzle, assumes too eccentric a position in the piston, which would lead to variations in the thermal loads along the circumference of the piston due to different wall thicknesses, and which would mean that the angular momentum of the air admitted through the intake passage, which is oriented towards the piston axis, cannot be fully utilized for fuel preparation in the toroidal part because of the eccentric position of the combustion chamber.

SUMMARY OF THE INVENTION

It is an object of the invention to develop an internal combustion engine of the type referred to at the beginning of this paper in such a way as to fully utilize the above advantages even in configurations characterized by an eccentric position of the injection nozzle.

In the invention this object is achieved by positioning the axis of the combustion chamber between the tip of the injection nozzle and the cylinder axis, and by designing the ring-shaped overflow passage such that its width varies, its narrowest part lying in the area next to the tip of the injection nozzle, and by making the top of the center part unsymmetrical, putting it at a minimum distance from the injection jets at the upper dead center of the piston. Placing the combustion chamber closer to the axis of the piston or the cylinder will result in a more uniform distribution of the thermal load on the piston, in addition to a better use of the rotational energy of the inflowing air, which in turn will lead to a higher mixture-forming energy. Due to the varying width of the overflow passage the ratio between the width of the overflow passage and the diameter of the generating circle of the torus is smaller in the area hit by the shorter injection jets than in that hit by the longer ones. This will intensify local air movements and thus improve preparation of the injected fuel, which is largely deposited on the wall in this area.

In order to minimize the distance between the top of the center part and the injection jets, the proposal is put forward by the invention that the too of the center part essentially be configured as a cone or truncated cone, which should be provided with an open space or recess receiving the tip of the injection nozzle at upper dead center of the piston. It is also possible to abandon the cone-shaped version and to configure the top as part of a sphere, for instance, as long as the required minimum distance of the injection jets can be maintained.

For the combustion chamber modified according to the invention it has proved an advantage to employ nozzles with 4 to 9 holes and a mean level of angular momentum of $(n_D/n)_m = 1.5$ to 3.0, $n_D$ being the number of revolutions of the vanes of the angular momentum meter obtained in a stationary test, and n being the engine speed calculated from the measured flow, the index m signifying that the ratio $n_D/n$ represents the mean value integrated from upper to lower dead center of the piston.

The mean free length of the fuel jet should amount to 15–35% of the diameter D of the cylinder in the invention.

A particularly favorable variant of the combustion chamber of an internal combustion engine as proposed by the invention is obtained by providing that the straight line generating the cone of the top of the center part be equidistant to the center axis of the injection jets at upper dead center of the piston, the distance $d_1$ being 2–8 mm, or that the line generating the cone of the top of the center part be equidistant to the cone formed by the injection jets, this distance $d_2$ being 1–6 mm, and the opening angle $\alpha$ of the cone of the injection jets being 4°–20°.

In this context it is an advantage if the axis of the joint cone for the center axes of all injection jets coincides with the rotational axis of the top of the center part, whose shape preferably is that of a cone or truncated cone.

BRIEF DESCRIPTION OF THE DRAWINGS

Following is a more detailed description of the invention as illustrated by the attached drawings, in which.

In all Figures identical parts have identical reference numbers.

DETAILED DESCRIPTION OF PREFERRED EMBODIMENTS

Figure 1:
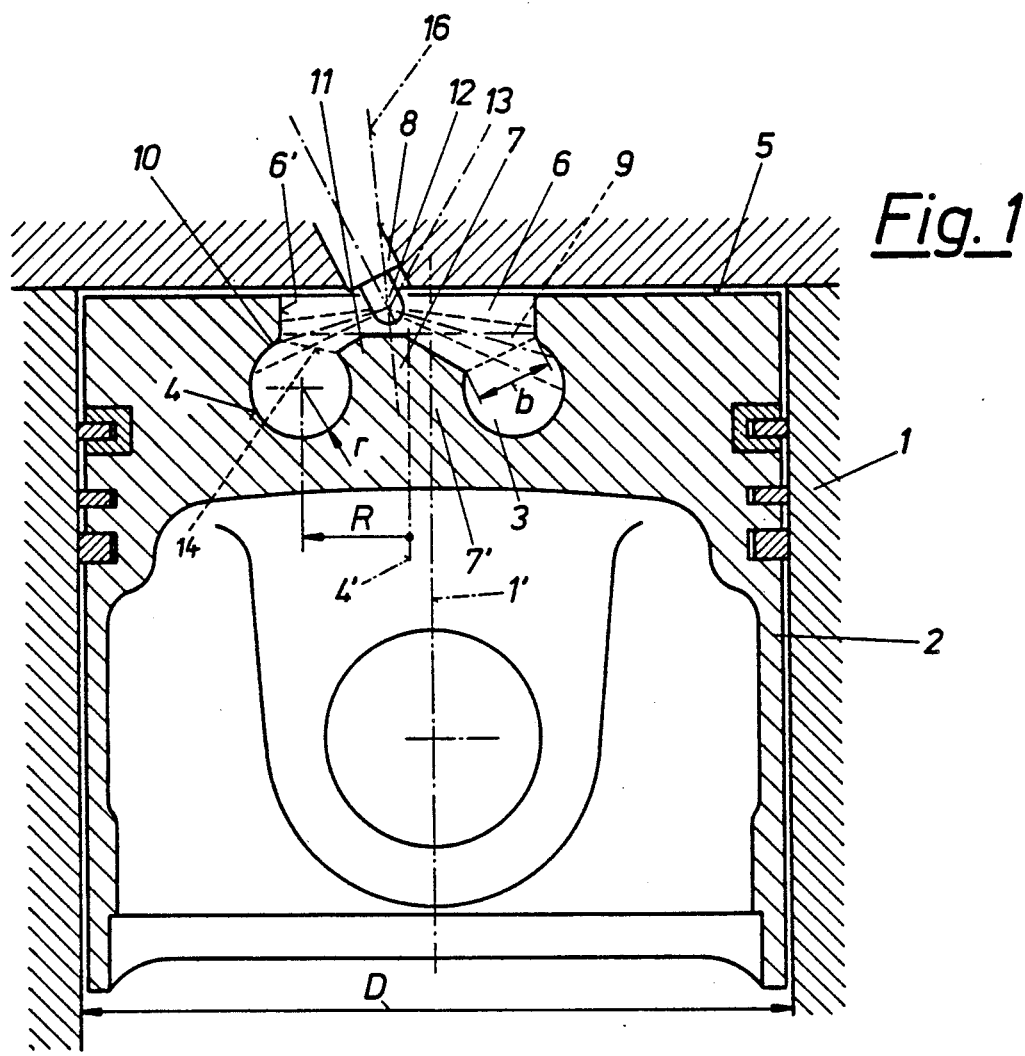
FIG. 1 is an axial section through the cylinder of an internal combustion engine according to the invention.

The piston 2 which is axially movable in the cylinder 1 with the diameter D, has a combustion chamber 3 comprising a toroidal part 4, with a radius R for the circle described by the center of the generating circle, and r for the generating circle itself. The generating cross-sections used for the toroidal part 4 need not necessarily be circular, the toroidal part 4 could also consist of two communicating parts with different R and r and a steady transition from one part to the other. The combustion chamber 3 has an axis 4' parallel to the cylinder axis 1', and a cylindrical part 6, which is open towards the piston lop 5 and forms a restricted passage 6' vis-a-vis the toroidal part 4 of the combustion chamber 3. The combustion chamber 3 has a center part 7 whose lower end 7' is part of the toroidal part 4 of the combustion chamber 3, and whose top 11 remains slightly below the fuel jets 9 delivered by the injection nozzle 8 at the upper dead center of the piston 2, thus ensuring that the top surface of the center part 7 will remain largely unwetted by the injection jets 9. The injection jets 9 are directed towards the area 10 leading from the toroidal part 4 into the cylindrical part 6 of the combustion chamber.

Figure 2:
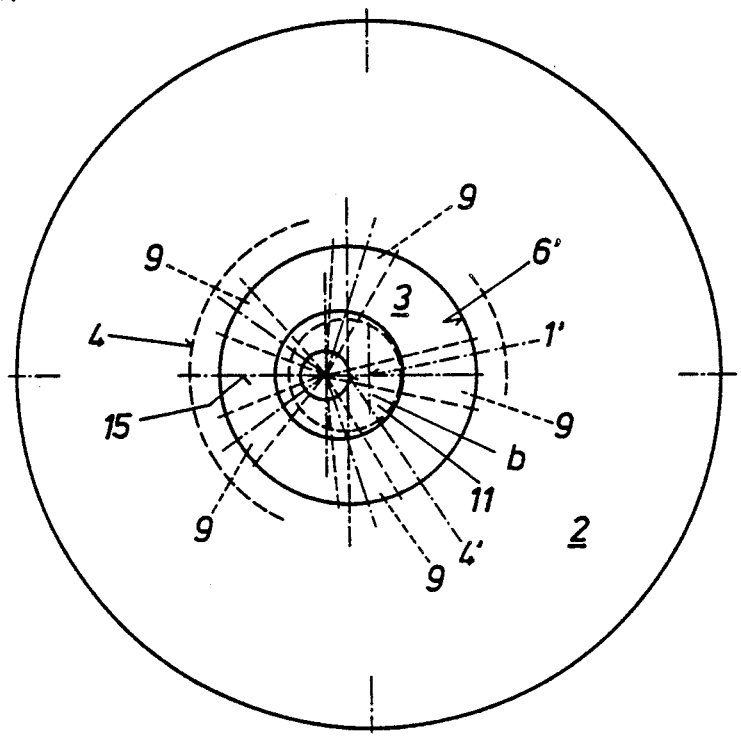
FIG. 2 is a view from above of the piston.

As is shown clearly in FIG. 1, the injection nozzle 8 is situated outside of the cylinder axis 1'. Due to the shifting of the combustion chamber 3 in the direction of the cylinder axis 1' the tip 12 of the injection nozzle 8 is brought into an eccentric position. In this context the eccentric position of the roots 13 of the injection jets relative to the axis 4' of the combustion chamber 3 is of particular importance. In the top 11 of the rotationally symmetric center part 7 is to keep a minimum distance from the injection jets 9 at the upper dead center of the piston 2, this top 11 must be unsymmetrical, e.g. shaped as an oblique cone or truncated cone; its axis 16 may coincide with the axis of the cone comprising the center axes of all injection jets 9. In this way the width b of the ring-shaped overflow passage 14 between the toroidal part 4 and the cylindrical part 6 will vary, the narrowest part of the passage being in the area 15 closest to the tip 12 of the injection nozzle 8, as is best seen in FIG. 2.

Figure 3:
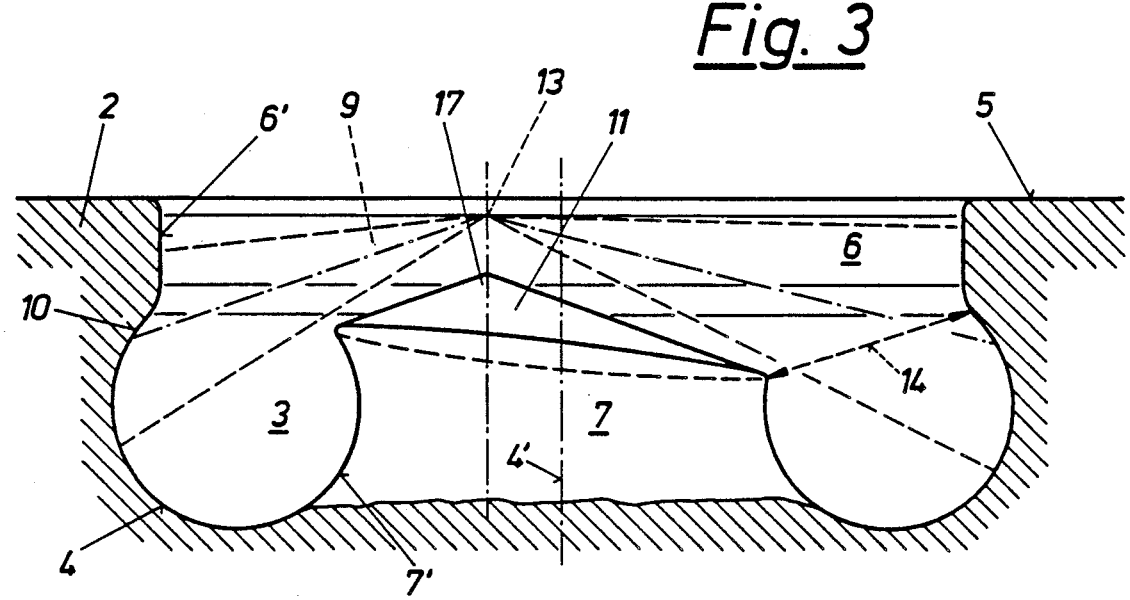
FIG. 3 shows a variant of FIG. 1 in detail.
Figure 4:
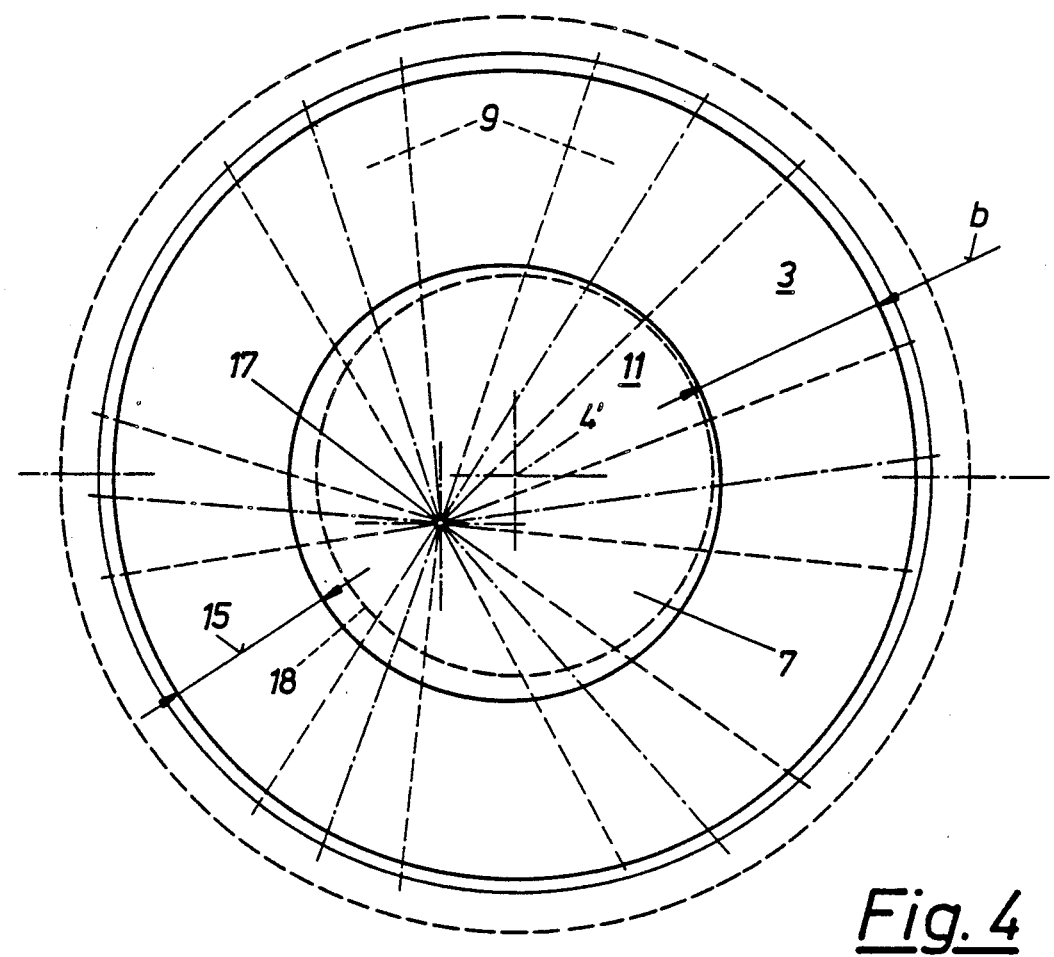
FIG. 4 is a view from above of the variant of FIG. 3, FIGS. 5a–5c give details of the contour of the combustion chamber, and FIG. 6 gives a diagram presenting the distance of the center axes of the injection jets plotted against jet lengths.

In the variant shown in FIGS. 3 and 4 the top 11 of the center part 7 is configured as a cone, whose vertex 17 is displaced relative to the axis 4' of the combustion chamber, such that the width b of the passage 14 will deviate from the constant value indicated by the broken line 18 and the passage is at its narrowest in the area 15.

Figure 5A:
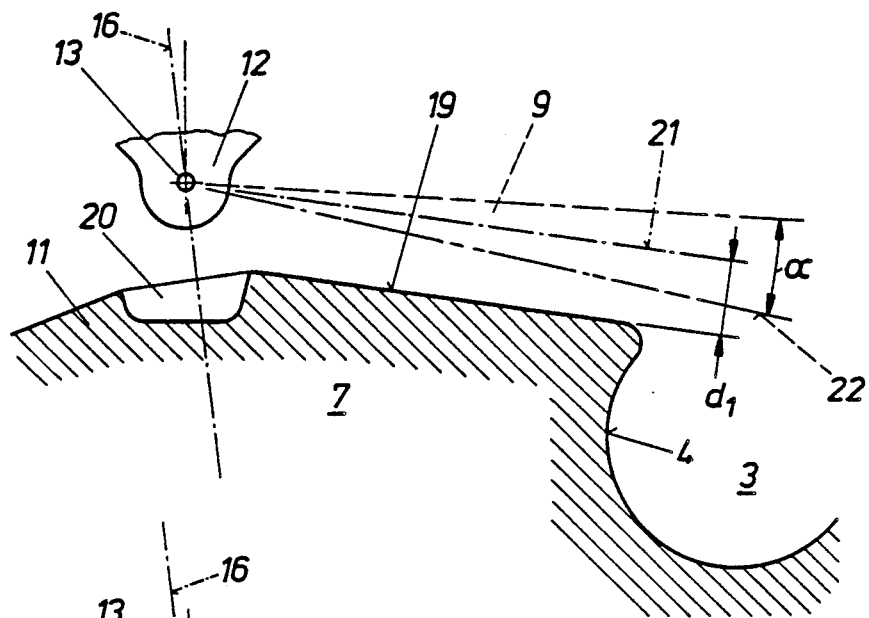
Figure 5B:
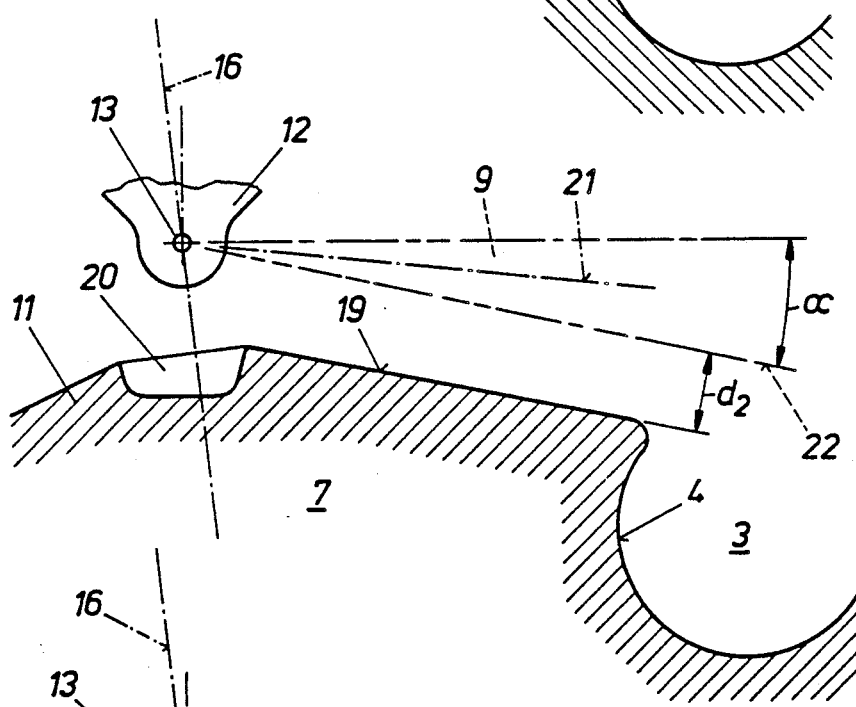
Figure 5C:
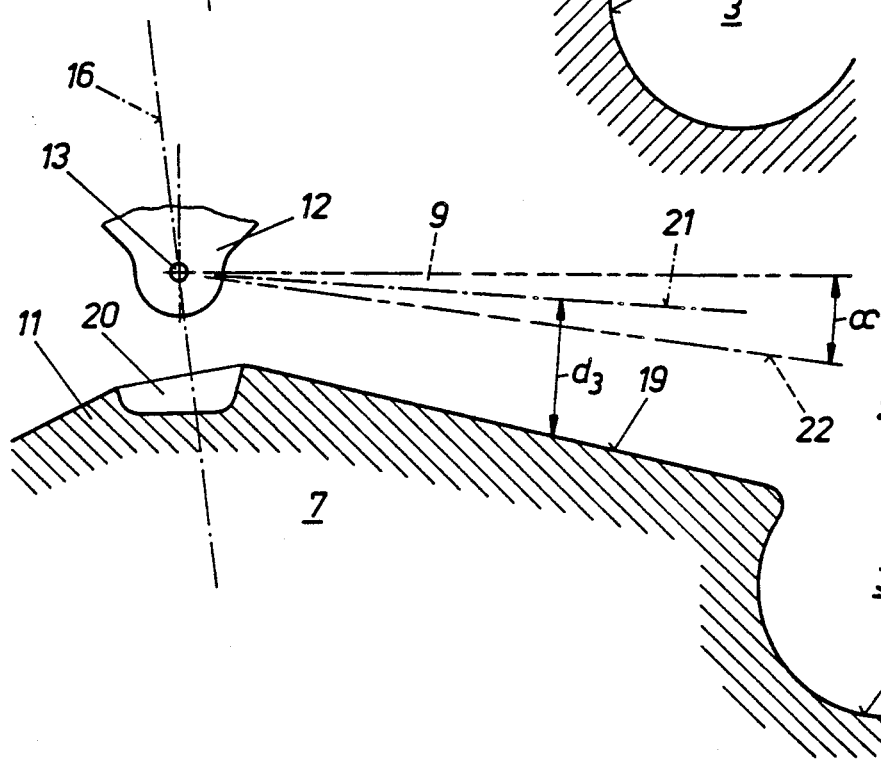

In the variant of the combustion chamber 3 presented in FIGS. 5a to 5c the contour of the top 11 of the center part 7 is only shown in part, i e. mainly the position, or rather, the distance between the straight line 19 generating the envelope of the top 11 and the injection jet 9. The nozzle tip 12 is received in a recess 20 in the top at the upper dead center of the piston.

In FIG. 5a, for instance, the generator 19 of the cone is equidistant to the center axis 21 of the injection jet 9 at the upper dead center of the piston, the distance $d_1$ being 2–8 mm. In FIG. 5b the generator 19 is at a distance of 1–6 mm from the cone 22 formed by the injection jet 9, the corresponding distance being referred to as $d_2$.

Figure 6:
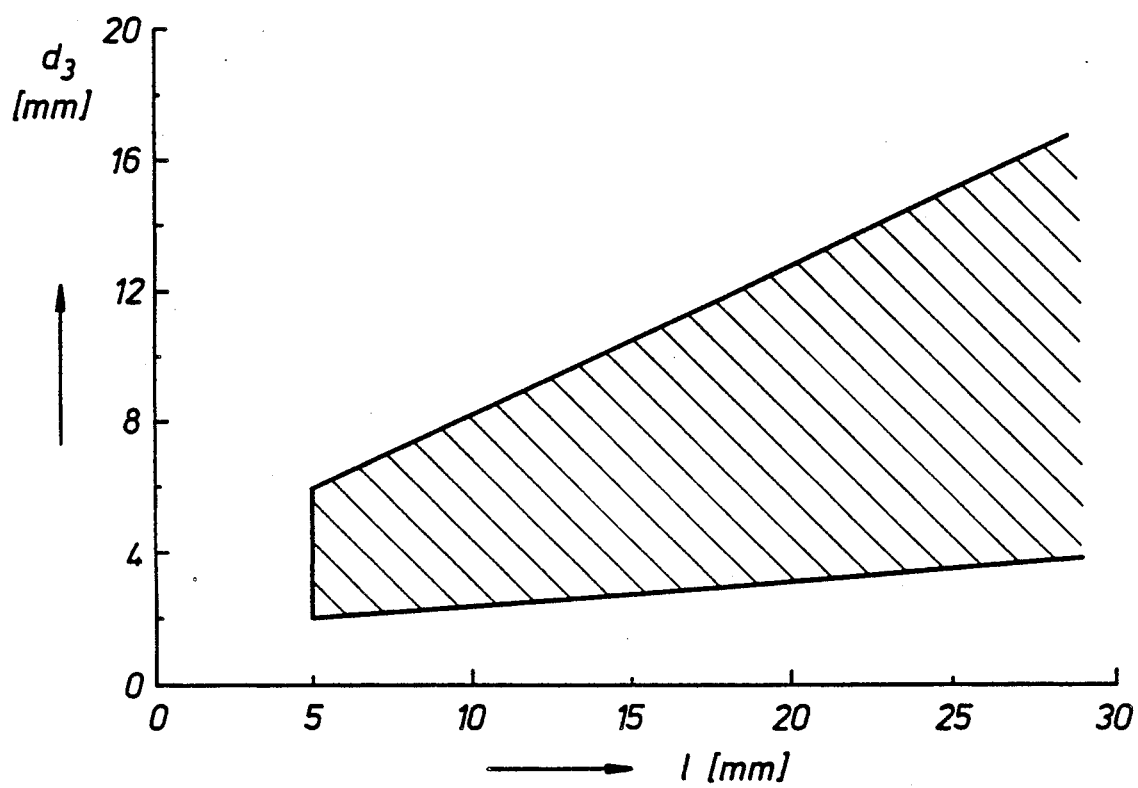

Finally, the distance $d_3$ between the generator 19 and the center axis 21 of the injection jet 9 in FIG. 5c satisfies the equation $d_3 = f(l)$, $f(l)$ being given by the diagram in FIG. 6, and l being the length of the injection jet as measured from the root of the jet. The opening angle $\alpha$ of the jet cone 22 is 4°–20°.

I claim:

1. A valve-controlled internal combustion engine having at least one cylinder defining a cylinder axis with a piston reciprocally mounted therein, with a swirling air charge and an injection nozzle for direct fuel injection, said piston comprising a combustion chamber having a toroidal section ending in a throat-like cylindrical part towards the top of said piston, a center part being provided in the center of said combustion chamber, defining a centrical axis and also forms part of said toroidal section, the top of said center part remaining just slightly below the fuel jets of said injection nozzle at upper dead center of said piston and forming a narrow, ring-shaped overflow passage together with the throat-like cylindrical part, leading from said toroidal section to said cylindrical part of said combustion chamber, the tip of said injection nozzle, which is provided with orifices, having an eccentric position in said cylinder, wherein said axis of said combustion chamber is situated between said tip of said injection nozzle and said cylinder axis, and wherein said ring-shaped overflow passage has a varying width, the narrowest part of said overflow passage lying in an area closest to said tip of said injection nozzle, and wherein said top of said center part is unsymmetrical in shape, with a minimum distance to said injection jets of said injection nozzle at upper dead center of said piston.

2. An internal combustion engine according to claim 1, wherein said top of said center part is configured as a cone or truncated cone, which is provided with an open space or recess receiving said tip of said injection nozzle at upper dead center of said piston.

3. An internal combustion engine according to claim 1, wherein said injection nozzle has 4 to 9 holes and a mean level of angular momentum of $(n_D/n)_m = 1.5$ to 3.0, wherein $n_D$ being the number of revolutions of the vanes of an angular momentum meter obtained in a stationary test of said internal combustion engine, and n being the engine speed calculated from the measured flow, and index m signifying that the ratio $n_D/n$ represents the mean value integrated from upper to lower dead center of said piston.

4. An internal combustion engine according to claim 3, wherein the mean free length of said fuel jets is 15 to 35% of the diameter of said cylinder.

5. An internal combustion engine according to claim 2, wherein the generating line of said cone of said top of said center part is equidistant to the center axis of said injection jets of said injection nozzle at upper dead center of said piston, the distance between said generating line and said center axis being 2 to 8 mm.

6. An internal combustion engine according to claim 2, wherein the generating line of said cone of said top of said center part is equidistant to the cone formed by said injection jets of said injection nozzle, the distance between said generating line and said cone formed by said injection jets being 1 to 6 mm, and the opening angle $\alpha$ of said jet cones being 4° to 20°.

7. An internal combustion engine according to claim 6, wherein the axis of a joint cone for said center axis of all of said injection jets coincides with a rotational axis of said top of said center part.

8. An internal combustion engine according to claim 5, wherein the axis of a joint cone for said center axis of all said injection jets coincides with a rotational axis of said top of said center part.

* * * * *